United States Patent [19]

McIntosh

[11] Patent Number: 4,611,824
[45] Date of Patent: Sep. 16, 1986

[54] CAB GUARD

[75] Inventor: Thomas K. McIntosh, Bloomfield, Ind.

[73] Assignee: The Bloomfield Manufacturing Company, Inc., Bloomfield, Ind.

[21] Appl. No.: 764,492

[22] Filed: Aug. 12, 1985

[51] Int. Cl.[4] .............................................. B60R 21/02
[52] U.S. Cl. .................................... 280/748; 280/770; 296/3; 296/43; 296/1 R
[58] Field of Search ................... 296/1 R, 3, 10, 43; 280/770, 748, 762

[56] References Cited

U.S. PATENT DOCUMENTS

| 2,865,670 | 12/1958 | Dunn | 296/24 R |
| 3,049,363 | 8/1962 | Marx | 280/748 |
| 3,704,030 | 11/1972 | McFerron | 280/762 |
| 3,765,713 | 10/1973 | Suitt | 296/3 |
| 3,841,695 | 10/1974 | Woodward | 296/43 |
| 3,907,057 | 9/1975 | Reddekopp | 280/748 |
| 3,913,967 | 10/1975 | Johnson | 296/1 R |
| 4,405,170 | 9/1983 | Raya | 296/10 |
| 4,564,216 | 1/1986 | Kinyon et al. | 280/770 |

Primary Examiner—Robert R. Song
Attorney, Agent, or Firm—Woodard, Weikart, Emhardt & Naughton

[57] ABSTRACT

A cab guard alternatively adaptable for a wide-bed pickup truck with a pair of front stake pockets and a mini-pickup truck with a pair of bed rails. The cab guard including a rigid screen structure, a pair of rigid end brackets, and mounting means for mounting the screen structure in alternate first and second operating positions. In the first operating position, the end brackets are attached to the ends of the screen structure and extend outwardly of the screen structure in a plane coplanar with the screen mesh and the cab guard is mounted in the front stake pockets of a wide-bed pickup truck. In the second of the operating positions, the end brackets are attached to the ends of the screen structure and extend in planes perpendicular to the screen mesh and the end brackets are mounted to the bed rails of a mini-pickup truck.

9 Claims, 5 Drawing Figures

CAB GUARD

BACKGROUND OF THE INVENTION

The present invention relates to a cab guard for use with pickup trucks and more specifically to an easily adjustable cab guard capable of fitting both wide-bed and mini-pickup trucks, domestic and foreign.

Pickup trucks are versatile vehicles, having many uses. One of their primary uses is in hauling various sizes, shapes and masses of loads. Such use, however, poses a number of risks and dangers. In placing and carrying a load in the bed of a truck, care must be taken so that damage is not done to the truck's rear cab window or to the truck cab itself. An even greater amount of care is called for in protecting the well being of persons in the cab of the truck, such as the driver and any passengers; for example, when a truck is in actual operation, caution must be taken to minimize damage resulting from the shifting or moving of a load being carried on the truck's bed.

The pickup truck user, while wanting to protect the driver, passengers and truck, wants to do so in a way which will not unduly limit or restrict the load carrying capability of the truck. Thus the user desires a means of protection which does not result in any substantial loss of bed carrying space. Also, since the rear window of the cab is the primary means by which the driver can directly view the rear of the truck, it is desirable for the protection to be accomplished by a means which does not unduly restrict and limit vision through this window.

With the increasing varieties and sizes of pickup trucks, both domestic and foreign, it is desirable to have a cab guard which may easily be alternatively adapted for use on wide-bed pickup trucks and mini-pickup trucks and requires only a minor amount of assembly.

SUMMARY OF THE INVENTION

One embodiment of the present invention includes a cab guard alternatively adaptable for a wide-bed pickup truck with a pair of front stake pockets and a mini-pickup truck with a pair of bed rails. The cab guard includes a rigid screen structure having a planar screen mesh and two ends. There is also provided a pair of rigid end brackets, each constructed and adapted for attachment to one of the ends of the screen structure in alternate first and second operating positions and mounting means for mounting the screen structure in these alternate first and second operating positions. In the first of the operating positions, the end brackets are attached to the ends of the screen structure and extend outwardly of the screen structure in a plane coplanar with the screen mesh for mounting each of the end brackets in one of the front stake pockets of a wide-bed pickup. In the second of the operating positions, the end brackets are attached to the ends of the screen structure and extend in a plane perpendicular to the screen mesh for mouting each of the end brackets to one of the bed rails of a mini-pickup.

It is an object of the present invention to provide a cab guard that serves to protect the driver, passengers and the truck with no loss of carrying space in the bed of the pickup truck.

Another object of the present invention to provide a cab guard that does not unduly limit or restrict vision through the rear window of the cab.

Yet another object of the present invention to provide a cab guard that is easily shipped and requires only a minor amount of assembly.

A further object of the present invention is to provide an improved cab guard alternatively adaptable for a wide-bed pickup truck and a mini-pickup truck.

Further objects and advantages of the present invention will be apparent from the following detailed description taken in conjunction with the appended claims.

DESCRIPTION OF THE PREFERRED EMBODIMENT

Figure 1:
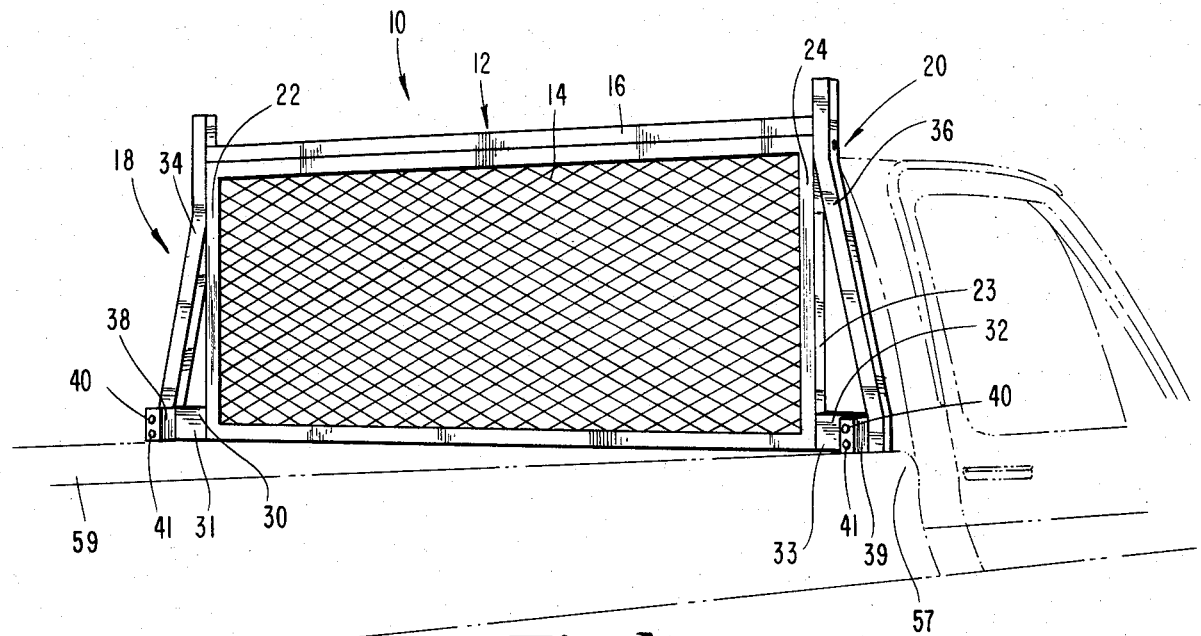
FIG. 1 is a perspective view of a cab guard according to a typical embodiment of the present invention, in the first operating position adaptable for a wide-bed pickup truck.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated herein being contemplated as would normally occur to one skilled in the art to which the invention relates.

The cab guard of the present invention is alternatively mountable in first and second operating positions, suitable for wide-bed pickup trucks and mini-pickup trucks, respectively. Referring initially to FIG. 1, cab guard 10 is illustrated in a configuration constructed and adapted for mounting to a wide-bed pickup truck. The cab guard 10 includes a screen structure 12 which has a planar screen mesh 14 fitted into a frame 16 and left and right end brackets 18 and 20, respectively, each having a base portion 30 and 32 and an arm portion 34 and 36, respectively. The screen mesh 14 is sufficiently expanded so as to not unduly limit or restrict viewing therethrough. In one embodiment, the planar screen mesh is made of a 16 gauge expanded metal mesh and the frame was made of a square 14 guage steel.

Figure 3:
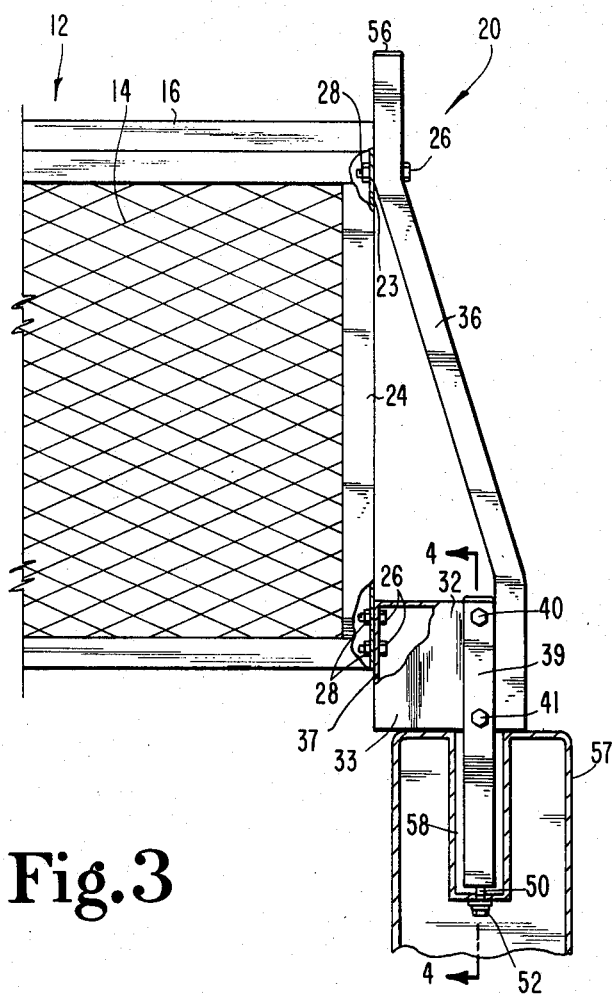
FIG. 3 is a fragmentary side view of the right end bracket-screen structure connection of the cab guard shown in FIG. 1.

In the first operating position, the left end bracket 18 and right end bracket 20 extend outwardly of the screen structure 12 in a plane substantially coplanar with that of screen mesh 14. FIG. 3 illustrates the fastening of right end bracket 20 to screen structure 12 for the cab guard 10 shown in FIG. 1. Side wall 37 of the base portion 32 and arm portion 36 of right end bracket 20 are attached by means of bolts 26 and nuts 28 to the side wall 23 of end 24 of screen structure 12 and serve to fasten right end bracket 20 to screen structure 12. It is understood, that when the cab guard is in the first operating position, the connection of left end bracket 18 to screen structure 12 is the mirror image of the above described connection of right end bracket 20 to screen structure 12.

The screen structure 12 with the end brackets 18 and 20 attached thereto so as to extend outwardly of the screen structure 12 in a plane substantially coplanar with the screen mesh 14 is placed across the front of the pickup truck bed. In the first operating position the face portions 31 and 33 of base portions 30 and 32 are fastened to stake tubes 38 and 39. Stake tubes 38 and 39 are tubular in shape, have a rectangular cross section and are received in the front stake pockets 58 of the wide-bed pickup truck. Within each of the stake tubes 38 and 39 is an eyebolt 46 which serves to secure the cab guard 10 to the pickup truck.

Figure 4:
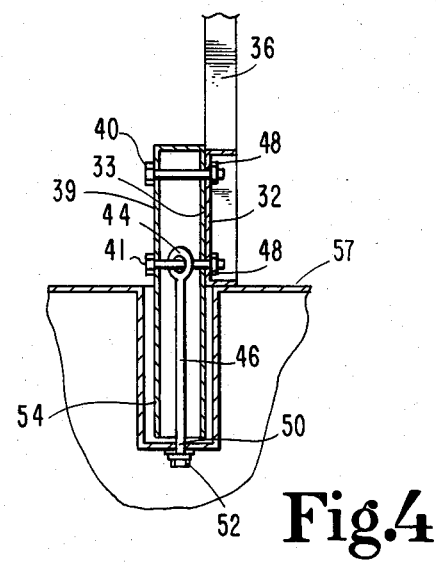
FIG. 4 is a cross-sectional view of the connection shown in FIG. 3 as taken along line 4—4 of FIG. 3 and viewed in the direction of the arrows.

FIGS. 3 and 4 illustrate the attachment of the right end bracket 20 to the stake tube 39. The right end bracket 20 is shown attached to the stake tube 39 by means of bolts 40 and 41, and nuts 48. When passing through the stake tube 39, the lower bolt 41 passes through eye hole portion 44 in the eyebolt 46. Bolts 40 and 41 pass through face portion 33 of the base portion 32 and are fastened with nuts 48. A nut 52 is fastened to the end 50 of eyebolt 46 so as to secure the stake tube 39 and thereby cab guard 10 to the wide bed pickup truck. It is understood, that when the cab guard is in the first operating position, the attachment of left end bracket 18 to the stake tube 38 is similar to that of right end bracket 20 to stake tube 39.

Additionally, plastic caps 56 are placed on the top of end bracket arm portions 34 and 36 and, if need be, may be driven into place in their respective arm portions with the aid of a device such as a rubber hammer.

Figure 2:
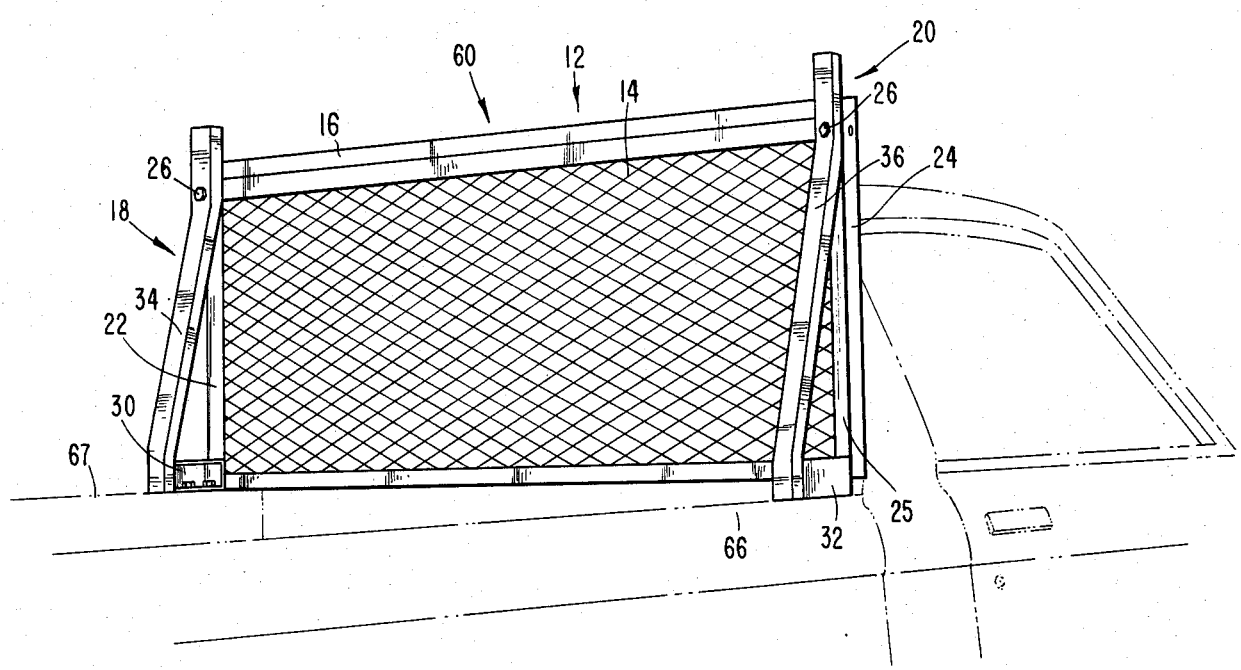
FIG. 2 is a perspective view of a cab guard according to a typical embodiment of the present invention, in the second operating position adaptable for a mini-pickup truck.

Now referring to FIG. 2, cab guard 60 is illustrated in a configuration constructed and adapted for mounting to a mini-pickup truck. In this second operating position, the same screen structure 12 and end brackets 18 and 20 are used but now the end brackets 18 and 20 are attached to the ends 22 and 24 of the screen structure 12 so as to extend in a plane generally perpendicular to that of the planar screen mesh 14 of the screen structure 12, i.e., the end brackets 18 and 20 are fastened to the screen structure 12 forming right angles.

Figure 5:
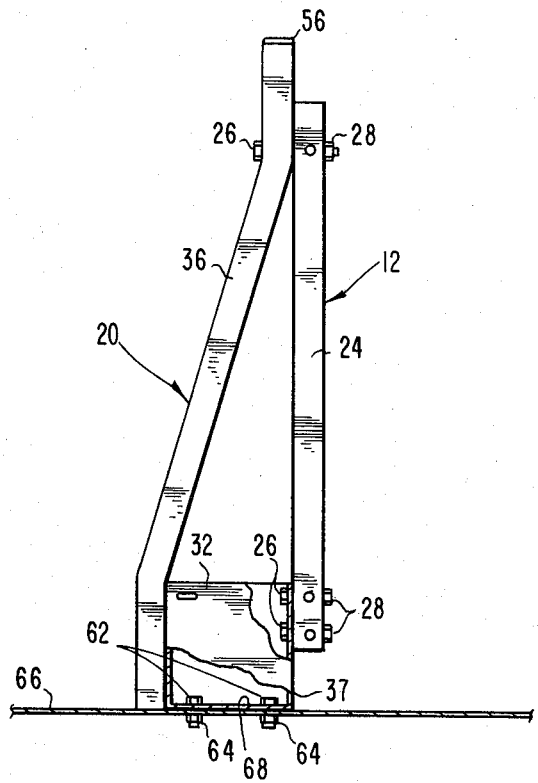
FIG. 5 is a fragmentary side view of the end bracket-screen structure connection of the cab guard shown in FIG. 2.

FIG. 5 illustrates, for the second operating position, the fastening of the right end bracket 20 to the screen structure 12. Side wall 37 of the base portion 32 and arm portion 36 of right end bracket 20 are attached by means of bolts 26 and nuts 28 to front wall 25 of end 24 of screen structure 12 and serve to fasten right end bracket 20 to screen structure 12. It is understood that for the second operating position, the connection of left end bracket 18 to screen structure 12 is similar to the above described connection of right end bracket 20 to screen structure 12.

The screen structure 12 with the end brackets 18 and 20 attached thereto so as to extend in a plane generally perpendicular to that of the planar screen mesh 14 of the screen structure 12 is placed across the front of the pickup truck bed. FIG. 5 illustrates the attachment of the cab guard 60 to the mini-pickup truck. The locations of holes in the bottom 68 of the base portion 32 of the end bracket 20 are marked on the bed rail 66. Holes are then drilled into the bed rail 66 at these marked locations. Using bolts 62 and nuts 64, cab guard 60 is bolted in place to the bed rail 66. It is understood that for the second operating position, the attachment of left end bracket 18 to bed rail 67 is the mirror image of the above described attachment of right end bracket 20 to bed rail 66.

Additionally, plastic caps 56 are placed on the top of end bracket arm portions 34 and 36 and, if need be, may be driven into place in their respective arm portions with the aid of a device such as a rubber hammer.

The cab guard of the present invention, while alternatively mountable in first and second operating positions suitable for wide-bed pickup trucks and mini-pickup trucks, respectively, requires only a minor amount of assembly for mounting in either of these operating position. In addition, the mounting of the cab guard of the present invention, whether in the front stake pockets as in the first operating position or on the bed rails as in the second operating position, does not result in the loss of any of the carrying space in the bed of the pickup truck.

While the invention has been illustrated and described in detail in the drawings and the foregoing description, the same is to be considered as illustrative and not restrictive in character, it being understood that only the preferred embodiment has been shown and described and that all changes and modifications that come within the spirit of the invention are desired to be protected.

What is claimed is:

1. A cab guard alternatively adaptable for a wide bed pickup truck with a pair of front stake pockets and a mini pickup truck with a pair of bed rails, comprising;
    a rigid screen structure including a planar screen mesh having two ends,
    a pair of rigid end brackets each constructed and adapted for attachment to one of the ends of said screen structure in alternate first and second operating positions, and
    mounting means for mounting said screen structure in alternative first and second operating positions;
        in the first of the operating positions said end brackets being attached to the ends of said screen structure and extending outwardly of said screen structure in a plane coplanar with the screen mesh, and said mounting means being for mounting each of said end brackets in one of the front stake pockets of a wide bed pickup truck, and
        in the second of the operating positions said end brackets being attached to the ends of said screen structure and extending in a plane perpendicular to the screen mesh, and said mounting means being for mounting each of said end brackets to one of the bed rails of a mini pickup truck.

2. The cab guard of claim 1 in which each of said end brackets has a base portion, and further in which said mounting means in said second position is for mounting the base portion of each of said end brackets to one of the bed rails of a mini pickup truck.

3. The cab guard of claim 1 additionally comprising a pair of stake tubes each receivable in one of the front stake pockets of a wide bed pickup truck, and in which each of said end brackets has a base portion, and further in which said mounting means in said first operating position is for mounting the base portion of each of said end brackets to respective ones of said pair of stake tubes.

4. The cab guard of claim 1 in which said planar screen mesh is rectangular and sufficiently sized to guard a rear cab window of a wide bed pickup truck and a mini pickup truck.

5. The cab guard of claim 4 in which the screen mesh is made of an expanded metal having a mesh sufficient to permit a cab rider to view through a rear cab window of a pickup truck.

6. The cab guard of claim 5 in which each of said end brackets has a base portion, and further in which said mounting means in said second position is for mounting the base portion of each of said end brackets to one of the bed rails of a mini pickup truck.

7. The cab guard of claim 5 additionally comprising a pair of stake tubes each receivable in one of the front stake pockets of a wide bed pickup truck, and in which each of said end brackets has a base portion, and further in which said mounting means in said first operating position is for mounting the base portion of each of said end brackets to respective ones of said pair of stake tubes.

8. A cab guard kit alternatively adaptable for a wide bed pickup truck with a pair of front stake pockets and a mini pickup truck with a pair of bed rails, comprising;
- a rigid screen structure including a planar screen mesh and having two ends,
- a pair of rigid end brackets constructed and adapted for attachment to the ends of said screen structure in alternate first and second operating positions, each of said end brackets having a base portion, and
- mounting means adapted for mounting said screen structure in alternate first and second operating positions, said mounting means including a pair of stake pocket tubes each receivable in a respective one of the front stake pockets of a wide bed pickup truck in the first of the operating positions, said mounting means being adaptable for mounting the base portion of each of said end brackets to one of said stake tubes received in the stake pockets of a wide bed pickup truck and to the bed rails of a mini pickup truck;
  - in the first of the operating positions each of said end brackets being attachable to one of the ends of said screen structure and extending outwardly of said screen structure in a plane coplanar with the screen mesh, and
  - in the second of the operating positions each of said end brackets being attachable to one of the ends of said screen structure and extending in a plane perpendicular to the screen mesh.

9. The cab guard kit of claim 8 in which said planar screen mesh is rectangular and sufficiently sized to guard a rear cab window of a wide bed pickup truck and a mini pickup truck.

* * * * *